No. 764,662. PATENTED JULY 12, 1904.
C. W. GIBBS.
NUT LOCK.
APPLICATION FILED FEB. 8, 1904.
NO MODEL.
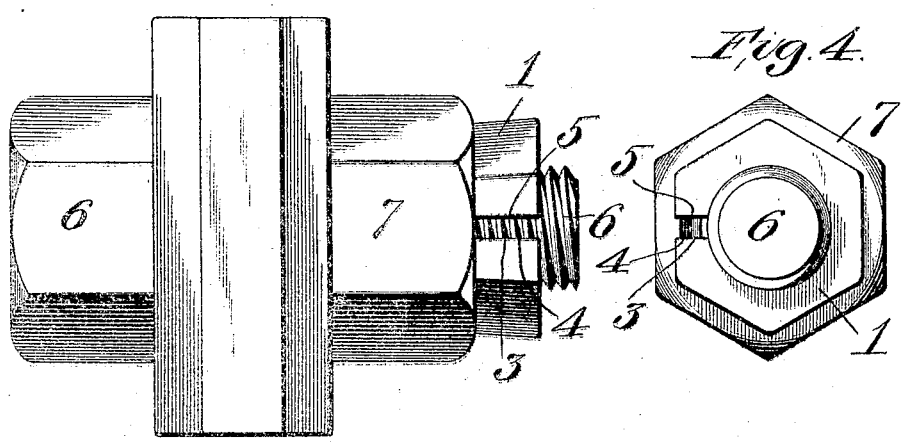
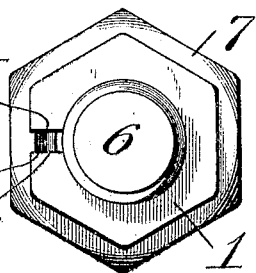
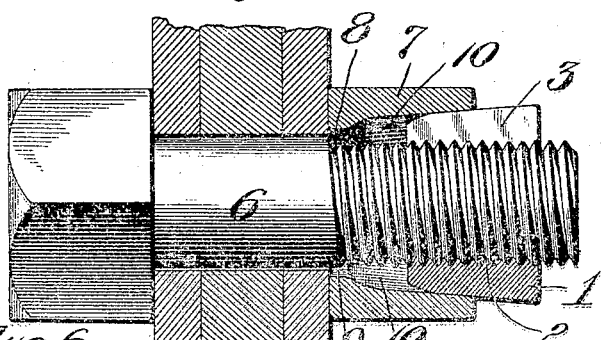
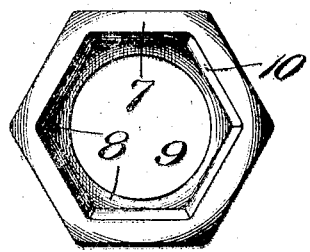
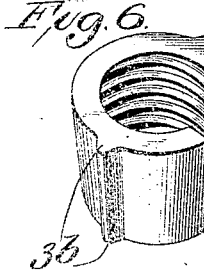
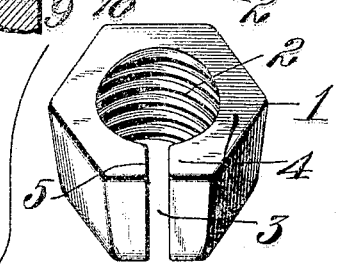
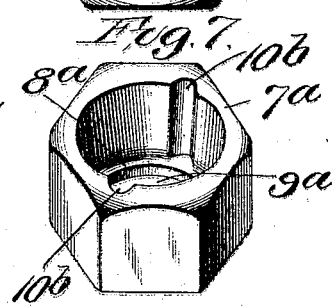
Witnesses:
Inventor:
Charles W. Gibbs,
by Bakewell & Cornwall
attys.

No. 764,662. Patented July 12, 1904.

UNITED STATES PATENT OFFICE.

CHARLES W. GIBBS, OF BRIDGEPORT, CONNECTICUT, ASSIGNOR TO COLUMBIA NUT & BOLT COMPANY, OF BRIDGEPORT, CONNECTICUT, A CORPORATION OF NEW YORK.

NUT-LOCK.

SPECIFICATION forming part of Letters Patent No. 764,662, dated July 12, 1904.

Application filed February 8, 1904. Serial No. 192,561. (No model.)

*To all whom it may concern:*

Be it known that I, CHARLES WALLACE GIBBS, a citizen of the United States, residing at Bridgeport, Fairfield county, Connecticut, have invented a certain new and useful Improvement in Nut-Locks, of which the following is a full, clear, and exact description, such as will enable others skilled in the art to which it appertains to make and use the same, reference being had to the accompanying drawings, forming part of this specification, in which—

Figure 1 is a view in side elevation of a bolt-lock constructed in accordance with my invention. Fig. 2 is a longitudinal sectional view through the lock, the bolt being shown in elevation. Fig. 3 is a disassociated view of the nut and the clamping-sleeve. Fig. 4 is a top plan view of the bolt-lock. Fig. 5 is an inverted plan view of the sleeve. Fig. 6 is a detail perspective view of a slightly-modified form of nut, and Fig. 7 is a detail perspective view of a sleeve therefor.

This invention relates to nut and bolt locks.

Among the objects thereof it is contemplated to provide means whereby the nut will be efficiently fastened on the threaded shank of the bolt so as to prevent accidental displacement. The nut is provided with a locking member capable of causing it to firmly bind on the threads of the bolt, which locking member is provided with stop means to limit the longitudinal movement of the nut. Means is also provided whereby the nut is capable of having a free longitudinal movement with relation to its locking member, but held against an independent rotative movement with relation thereto.

The novel features of the invention, as well as the mode of operation, will become apparent as the nature of the invention is better understood.

One of the essential features of this invention is to provide means whereby the locking part will be caused to bind or impinge upon the surface of one of the parts to be secured by the bolt and to prevent contact of the nut with the clamped part.

In Figs. 1 to 5, inclusive, I have illustrated the preferred form of bolt-lock, in which the reference-numeral 1 designates a nut having the usual internal threads 2. This nut is illustrated as having a polygonal exterior gradually tapering from one end toward the other and provided with a longitudinally-disposed slit 3 to space apart the adjacent edges 4 and 5. If desired, the nut 1 may be exteriorly formed with an uninterrupted wall—that is to say, the wall may be free from shoulders or any inequalities—and in this instance the exterior of the nut will present the appearance of the frustum of a cone, or, if desired, the nut may be in the form similar to that shown in the patent to M. Bartley, No. 730,599, patented June 9, 1903, in which event the sleeve will have oppositely-disposed recesses or channels to receive the lugs or projections on the nut, and said sleeve will also be provided with an inwardly-disposed web-flange $8^a$, as will be explained hereinafter. The nut may be formed of such material as will have the necessary yielding properties, permitting the edges 4 and 5 to be forced toward each other, whereby the threads 2 will be caused to efficiently bind against the threads of a suitable bolt, which in this instance is indicated by the reference-numeral 6, Figs. 1 and 2.

The means for binding the nut against the threads of the bolt is illustrated as comprising a sleeve member 7, whose inner walls are tapered or inclined to conform to the angle of inclination of the outer walls of the nut, but are arranged at such angles as to cause the nut to yield by movement of the sleeve thereon, whereby the clamping effect is produced. At the end of the sleeve 7, adjacent to the parts to be clamped by the bolt, is an inwardly-projecting web-flange 8, surrounding an opening 9 of greater diameter than the shank of the bolt 6. This flange not only constitutes a seat or base for the sleeve, but assists in materially strengthening the sleeve, so as to overcome any tendency to expand when the two parts are forced together, and it also serves the purpose of a stop to prevent the nut from passing through the sleeve under pressure. In the event that the nut came in contact with the stop-flange 8 the sleeve would be forced along on the shank of the bolt into contact with the object being clamped, so that the sleeve would be firmly forced against said object and at the same time the nut would be constricted or caused to bind against the threads of the bolt, whereby the rigidity of the several parts with relation to each other will be assured. By providing the straight longitudinal slit 3 pressure will be equally exerted upon both sides of the nut, and a uniform clamping effect will result. 11 designates the fillets at the juncture of the base-flange 8 with the part 7, which fillets are capable of frictionally engaging the curved surfaces 12 of the part 1 when the flange and the end of the part 1 are adjacent each other to assist in locking parts 1 and 7 together.

In the form illustrated in Figs. 6 and 7 the nut or the part which engages the bolt is indicated by the reference-numeral $3^a$, having means for preventing an independent rotative movement with relation to the sleeve $7^a$, which means comprises longitudinal lugs or projections $3^b$, coinciding with the recesses or channels $10^b$ in the sleeve. The longitudinally-disposed slot $4^a$ will permit the part $3^a$ to firmly bind upon the bolt as the central opening thereof is constricted by means of its sleeve. At the end of the sleeve $7^a$, adjacent to the parts to be clamped by the bolt, is an inwardly-projecting flange $8^a$, surrounding an opening $9^a$ of greater diameter than the shank of the coöperating bolt. It will be seen that in both forms the common feature is retained—namely, the web-flange—to prevent the inner end of the nut from passing through the sleeve, so that the sleeve will be caused to firmly bind against the surface of one of the parts to be clamped, at the same time constricting the threaded opening in the nut to cause it to firmly lock upon the bolt and permitting independent longitudinal movement of the parts, but preventing independent rotative movement thereof.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

A nut and bolt lock comprising two members, one of which is a nut having a longitudinal slit extending from end to end and entirely through one of the side walls thereof, said nut having a polygonal exterior and being internally threaded, and the other member having a polygonal clamping-socket, the interior walls of which comprise a series of straight faces conforming to the polygonal exterior of the nut, and a stop-flange at one end of the socket and surrounding an opening of greater diameter than the diameter of the opening in the first member, the edges of the opening in the second member being unthreaded, said parts being arranged so that the first member is slidable in the second member; substantially as described.

In testimony whereof I hereunto affix my signature, in the presence of two witnesses, this 2d day of February, 1904.

CHAS. W. GIBBS.

Witnesses:
 FRED ATWATER,
 EDITH B. EVANS.